United States Patent
Walters et al.

(10) Patent No.: US 10,824,928 B2
(45) Date of Patent: *Nov. 3, 2020

(54) SYSTEM AND METHOD FOR TRASMITTING FINANCIAL INFORMATION VIA COLOR MATRIX CODE

(71) Applicant: Capital One Services, LLC, McLean, VA (US)

(72) Inventors: Austin Grant Walters, Savoy, IL (US); Jeremy Edward Goodsitt, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/739,002

(22) Filed: Jan. 9, 2020

(65) Prior Publication Data

US 2020/0226438 A1    Jul. 16, 2020

Related U.S. Application Data

(63) Continuation of application No. 16/248,440, filed on Jan. 15, 2019, now Pat. No. 10,599,964.

(51) Int. Cl.
*G06K 19/06* (2006.01)
*G06Q 20/40* (2012.01)
*G06Q 20/38* (2012.01)

(52) U.S. Cl.
CPC ... *G06K 19/0614* (2013.01); *G06K 19/06037* (2013.01); *G06K 19/06056* (2013.01); *G06Q 20/40* (2013.01); *G06K 2019/06225* (2013.01); *G06Q 20/3829* (2013.01); *G06Q 2220/00* (2013.01)

(58) Field of Classification Search
CPC ................................................. G06K 19/0614
USPC .................. 235/379, 462.04, 494, 435, 488; 705/14.1, 27.1
See application file for complete search history.

(56) References Cited

U.S. PATENT DOCUMENTS

| | | | |
|---|---|---|---|
| 7,494,053 B1 * | 2/2009 | Burns | G07F 19/20 235/379 |
| 9,111,186 B2 * | 8/2015 | Blasinski | G06K 19/0614 |
| 9,760,820 B2 * | 9/2017 | Lin | G06K 19/06037 |
| 9,805,296 B2 * | 10/2017 | Loy | G06K 19/0614 |
| 2004/0246529 A1 * | 12/2004 | Pruden | G06K 1/121 358/3.28 |

(Continued)

OTHER PUBLICATIONS

Extended European Search Report for European Patent Application No. 20152027.7 dated May 26, 2020, 8 pages.

*Primary Examiner* — Allyson N Trail

(57) ABSTRACT

An apparatus may include a memory to store instructions; and processing circuitry, coupled with the memory, operable to execute the instructions. When executed, the instructions may cause the processing circuitry to identify a matrix code; read a first layer of the matrix code, the first layer comprising a first account identifier associated with an account, wherein the first layer corresponds to a first color channel; and read a second layer of the matrix code, the second layer comprising a set of account data, associated with the account, wherein the second layer corresponds to a second color channel, different than the first color channel.

20 Claims, 10 Drawing Sheets

(56) References Cited

U.S. PATENT DOCUMENTS

| | | | |
|---|---|---|---|
| 2009/0166418 A1* | 7/2009 | Onoda | G06K 19/06037 235/435 |
| 2013/0092738 A1* | 4/2013 | Blasinski | G06K 19/0614 235/462.04 |
| 2013/0162674 A1* | 6/2013 | Nakamura | G06K 9/00671 345/633 |
| 2013/0197980 A1* | 8/2013 | Lerner | G06Q 20/387 705/14.1 |
| 2014/0127738 A1* | 5/2014 | Lee | C12Q 1/02 435/29 |
| 2014/0184071 A1* | 7/2014 | Peck | H05B 45/10 315/90 |
| 2015/0294460 A1* | 10/2015 | Satish | G06T 7/0012 382/128 |
| 2016/0253732 A1* | 9/2016 | Brown | G06K 7/10722 235/462.11 |
| 2017/0243097 A1 | 8/2017 | Loy et al. | |
| 2017/0309104 A1* | 10/2017 | Lewis | G07D 7/20 |
| 2018/0315046 A1* | 11/2018 | Joao | G06Q 20/4014 |

\* cited by examiner

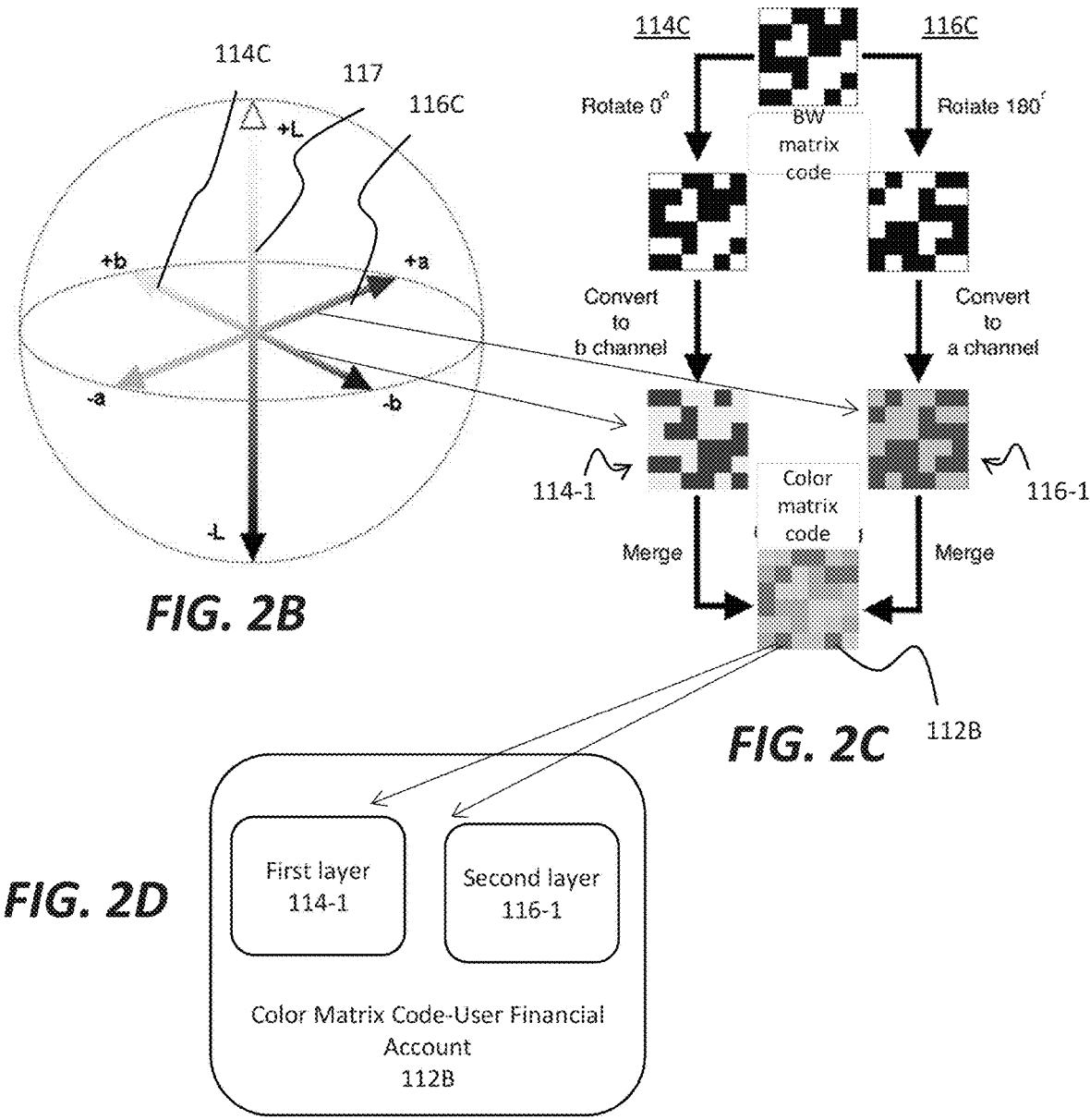

SYSTEM AND METHOD FOR TRASMITTING FINANCIAL INFORMATION VIA COLOR MATRIX CODE

RELATED APPLICATION

This application is a continuation of U.S. patent application Ser. No. 16/248,440, titled "SYSTEM AND METHOD FOR TRANSMITTING FINANCIAL INFORMATION VIA COLOR MATRIX CODE" filed on Jan. 15, 2019. The contents of the aforementioned application are incorporated herein by reference in their entirety.

TECHNICAL FIELD

Embodiments herein generally relate to financial transactions, and more specifically, to conducting secure transactions via matrix code.

BACKGROUND

Matrix codes are widely deployed to store and transmit data and information, including financial information. At present matrix codes may be designed to provide rapid access to data using known scanning techniques and devices. While information may be encoded, present day matrix codes may be prone to errors and may be relatively limited in the amount of data encoded. Reading and transmitting of information stored in matrix codes may therefore be unsatisfactory for purposes of many transactions, including transferring of financial assets, where accuracy and security may be at a premium.

SUMMARY

In various embodiments, there are disclosed a system, method and a non-transitory computer readable medium that implements processing circuitry to transmit financial information via color matrix code.

In one embodiment, an apparatus is provided, including a memory to store instructions; and processing circuitry, coupled with the memory, operable to execute the instructions. When executed, the instructions may cause the processing circuitry to identify a matrix code; read a first layer of the matrix code, the first layer comprising a first account identifier associated with an account, wherein the first layer corresponds to a first color channel; and read a second layer of the matrix code, the second layer comprising a set of account data, associated with the account, wherein the second layer corresponds to a second color channel, different than the first color channel.

In a further embodiment, a method may include receiving a message, comprising a matrix code. The matrix code may include a first layer comprising a first account identifier associated with an account, wherein the first layer comprises a first color channel; and a second layer, the second layer comprising a set of account data, associated with the account, wherein the second layer comprises a second color channel, different than the first color channel. The method may include transmitting a response to the message, the response comprising a transaction authorization, associated with the account.

In another embodiment, a non-transitory computer-readable storage medium is provided for storing computer-readable program code executable by a processor to receive a message, comprising a matrix code. The matrix code may include a first layer comprising a first account identifier associated with an account, wherein the first layer comprises a first color channel, and a second layer, the second layer comprising a set of account data, associated with the account, wherein the second layer comprises a second color channel, different than the first color channel. The computer-readable program code may be further executable by the processor to transmit a response to the message, the response comprising transaction authorization, associated with the account.

BRIEF DESCRIPTION OF THE DRAWINGS

FIGS. 2B-2D provide details of generating one variant of a color matrix code, according to embodiments of the disclosure.

DETAILED DESCRIPTION

Figure 1:
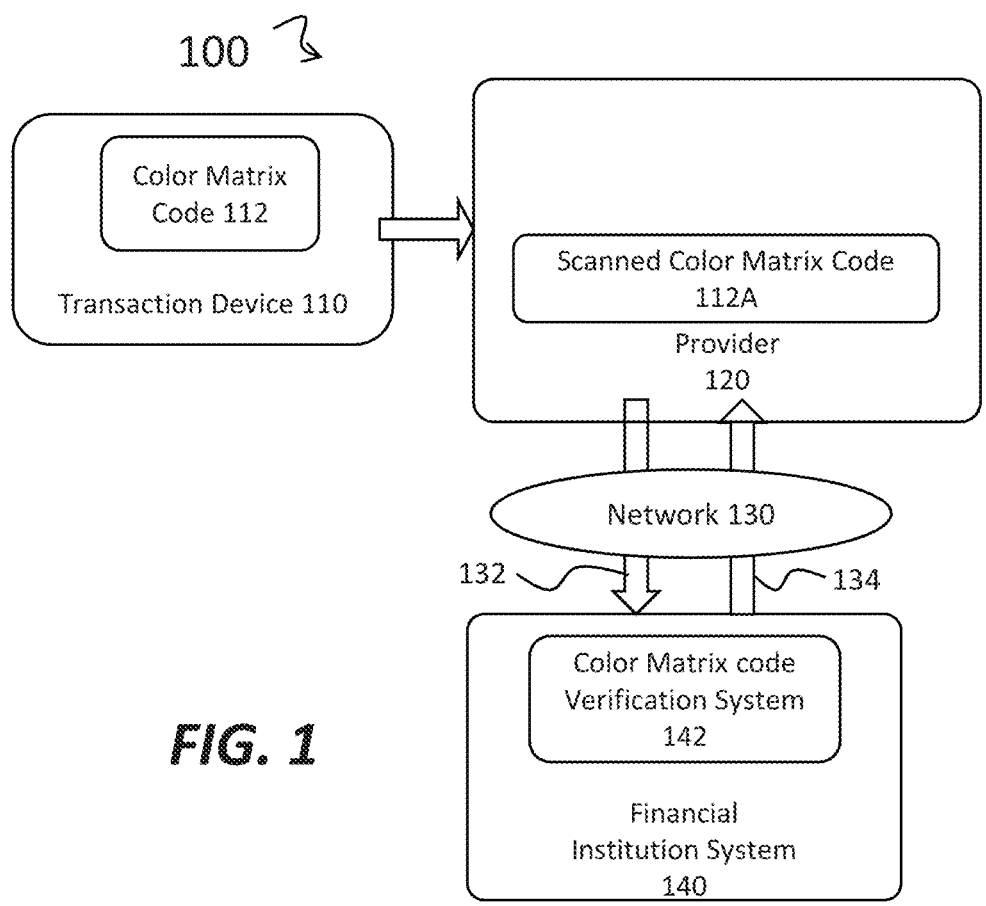
FIG. 1 illustrates an embodiment of a system.

Embodiments disclosed herein provide a novel system and method for conducting financial transactions via matrix codes. According to embodiments of the disclosure, a color-based matrix code (or "color matrix code") is provided to encode different types of financial information in different layers of the color matrix code. In particular embodiments, the matrix code may be composed of at least two color channels, where a given color channel corresponds to a determined range of color in any suitable color space.

One example of a color matrix code is a matrix code where different color channels are created from an RGB (red-blue-green) color space. Another example of a color matrix code uses color channels created at least in part from a LAB color space. The LAB color space (or CIELAB color space) is a color space defined by the International Commission on Illumination (CIE) in 1976, and expresses color as three numerical values, L* for the lightness and a* and b* for the green-red and blue-yellow color components.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 depicts a schematic of a system 100, consistent with disclosed embodiments. The system 100 may comprise one or more providers, shown as provider 120, where the provider may supply a product or service to a customer (not shown) via use of a transaction device 110. In some examples, the transaction device 110 may be a card, such as a transaction card. The transaction device 110 may include a color matrix code 112, described in more detail below. In brief, the color matrix code 112 may be arranged as a two-dimensional multi-color image, having a structure similar to known black and white matrix codes. The color matrix code 112 may provide data or information readable by a scanner or camera, such as a color camera (not shown). During a transaction, the color matrix code 112 may be presented to a provider 120 to facilitate a financial transaction, such as a transfer of financial assets from or to a financial account. Thus, a provider camera may scan the color matrix code 112 to generate a scanned color matrix code 112A, to be transmitted as a message 132 in electrical, electronic, or electromagnetic means, to an outside party, such as a financial institution system 140. The transmission of the scanned color matrix code 112A may be performed as transmission of digital data, for example. In the description to follow the term "color matrix code" may refer to information or data extracted from a color matrix code, such as the scanned color matrix code 112A, as well as data embedded in individual layers of the scanned color matrix code.

As detailed below, the color matrix code 112 may embed various levels of information, in a plurality of layers, to be received by the outside party, such as the financial institution system 140. In turn, the financial institution system 140 may include s Color Matrix code Verification System, to read the information in the color matrix code 112 (or scanned color matrix code 112A), in particular, in different layers of the color matrix code 112. In turn, the financial institution system 140 may transmit a response message 134 to the provider 120, responsive to the receiving of the color matrix code 112. The response message may authorize or facilitate transfer of assets from the financial institution associated with the financial institution system 140 to the provider 120 in one scenario. Examples of a financial institution include a commercial lender, a bank, a brokerage account, a credit card institution, or other commercial institution. The embodiments are not limited in this context.

Figure 2A:
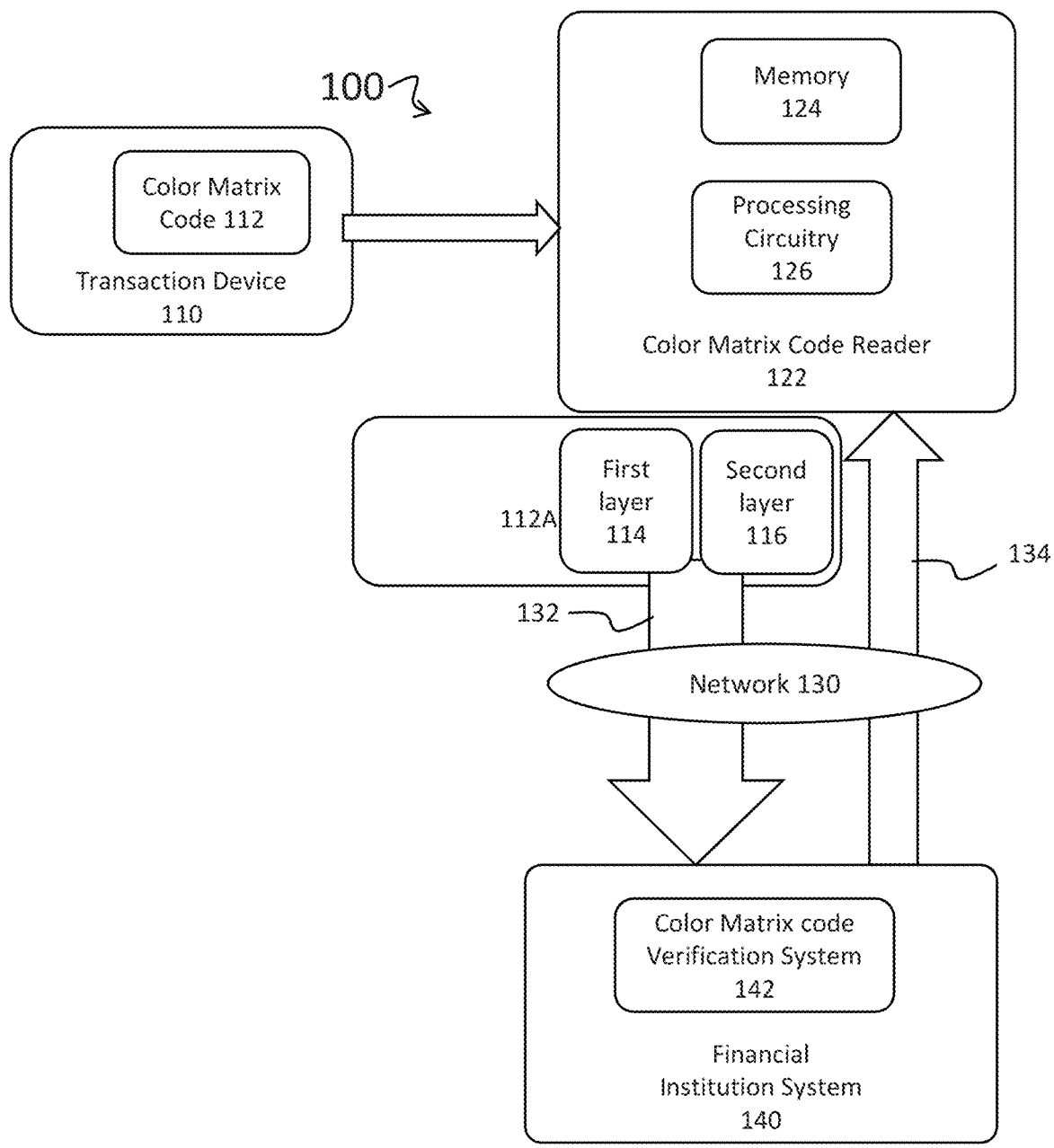
FIG. 2A provides details of one variant of the system of FIG. 1A.

FIG. 2A provides details of one variant of the system 100. In this example, the provider may include an apparatus, shown as a color matrix code reader 122, to read the color matrix code 112. The color matrix code reader 122 may include or may be coupled to a color camera (not separately shown) to receive and interpret an image of the color matrix code 112. The color matrix code reader 122 may comprise a computing device, such as a server, workstation, desktop, or mobile device (e.g., laptop, tablet, phablet, smartphone, smartwatch, or similar mobile computing device). Generally, in the present embodiments, a provider 120 or other providers may include a plurality of color matrix code readers, such as the color matrix code reader 122. Likewise, a financial institution system 140 may be a standalone system, may be part of a subsystem, which subsystem may be part of a larger system. For example, financial institution system 104 may include distributed servers that are remotely located and communicate with other systems of the financial institution over a public network, or over a dedicated private network.

More particularly, the color matrix code reader 122 may include a memory 124, to store instructions, as well as processing circuitry 126, coupled with the memory 124, where the processing circuitry 126 is operable to execute the instructions, that when executed, cause the processing circuitry 126 to identify a matrix code, including the color matrix code 112. As explained in more detail below, the processing circuitry 126 may read a first layer 114 of the color matrix code, meaning to transform into digital form information stored in the first layer 114. The processing circuitry 126 may read a second layer 116 of the color matrix code 112. As such, the first layer 114 and second layer 116 may be transmitted in a message 132 to the financial institution system 140.

Advantageously, consistent with some embodiments of the disclosure, the color matrix code 112 may embed different types of information in the different layers of the color matrix code 112. As an example, different account identifiers may be used to identify a commercial or financial institution associated with the financial institution system 140, may identify a user account of the financial institution, may include specific account data associated with the user account, and so forth.

Thus, in one implementation, the first layer 114 may comprise a first account identifier associated with an account, and the second layer 116 may comprise a second account identifier, associated with the account. As detailed below, the first layer 114 may correspond to a first color channel, while the second layer 116 corresponds to a second color channel, different from the first color channel.

FIGS. 2B-2D provides details of generating one variant of a color matrix code, shown as color matrix code 112B, containing user financial account information. The color matrix code 112B may include a first layer 114-1 and a second layer 116-1. These layers may correspond to two different color channels. In accordance with various embodiments of the disclosure, the color channels may be derived from any suitable color system including the RGB system, CIELAB system, and so forth. Generally, different color channels may be defined along any suitable vector in color space for a given color system. In a three-dimensional system, vectors may define along any direction with three dimensional space.

FIG. 2B illustrates a perspective representation of a LAB color space, where a first channel 114C corresponds to a blue yellow color channel, while a second channel 116C, corresponds to a red green color channel. As shown, the LAB color space also includes a luminance channel 117. As such, the first layer 114-1 may be formed by transforming a two-dimensional black white image into a yellow blue image, while the second layer 116-1 is formed by transforming a two-dimensional black white image (in the example shown, the two-dimensional black white image for second layer 116-1 is a rotated version of the image for forming first layer 114-2) into a red green image. The two color images may then be merged or overlaid upon one another to form the color matrix code 112B. Notably, a camera device, operating in conjunction with the color matrix code reader 122, may image the color matrix code 112B and extract the first layer 114-1 from the second layer 116-1 according to known image processing techniques. Said differently, the blue yellow image of the first layer 114-1 and the red green image of the second layer 116-1 may be individually extracted from the composite color image presented by the color matrix code 112B. The information contained in the first layer 114-1 and second layer 116-1 may then be treated according to known techniques, including storing, transmitting, or receiving the information of the first layer 114-1 and second layer 116-1.

Figure 3:
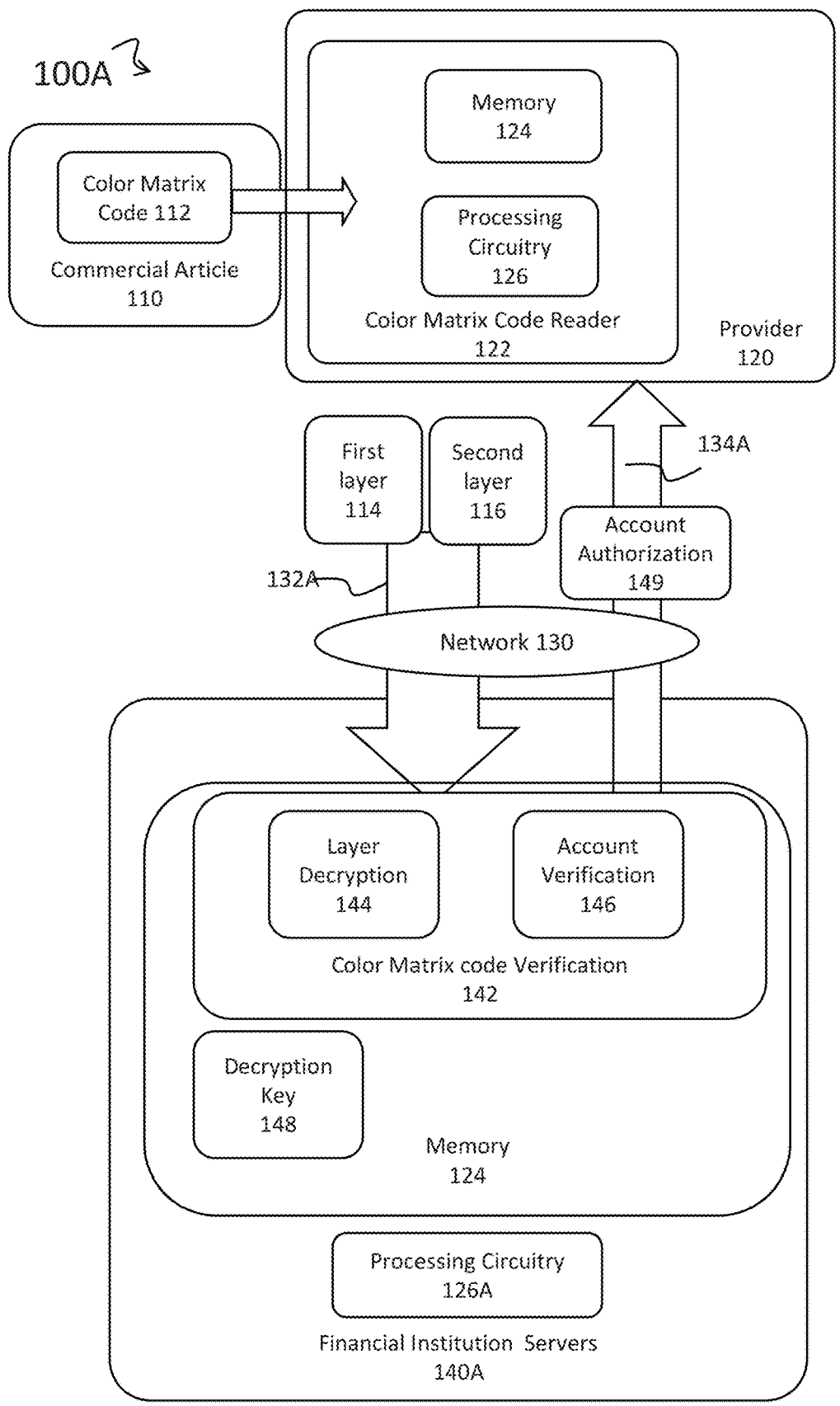
FIG. 3 presents another scenario for processing a color matrix code, according to embodiments of the disclosure.

Following the example of FIG. 2, FIG. 3 presents another scenario for processing a color matrix code 112, according to embodiments of the disclosure, using a system 100A. In different implementations, a user (not shown) may present a transaction device 110 to the color matrix code reader 122. The transaction device 110 may include a permanent image of the color matrix code 112, such as on a card, or an evanescent image, such as on an electronic screen of an electronic device, smart phone, tablet, etc. The color matrix code reader 122 may then image the color matrix code 112, extract different layers of the color matrix code, and process the different layers.

During a financial transaction with a provider 120 (see FIG. 1), the color matrix code reader 122 may be used to transfer financial assets of the user that are managed by the financial institution or provider 120. In the scenario of FIG. 3, the first layer 114 and second layer 116 are extracted from the color matrix code 112 and transmitted in a message 132 to financial institution servers 140A via the network 130. According to some embodiments, the color matrix code 112 may store financial information in encrypted form. Thus, in one implementation, the first layer 114 may comprise a first account identifier associated with an account, in encrypted form, while the second layer 116 comprises a second account identifier, associated with the account, either in encrypted form or in non-encrypted form. Accordingly, when transmitted over the network 130, at least a portion of the information of color matrix code 112 may be unreadable by a third party, even if intercepted during transmission.

In various embodiments, the financial institution servers 140A may be a single server, a group of servers, collocated with one another, or distributed over a network associated with the financial institution 120. Generally, the capability of decrypting the information of the color matrix code 112 may be stored in the financial institution servers 140A, such as in a memory 124. The memory 124 may thus be embodied in one or more servers, either in partial form, where encryption capability associated with different layers may be stored in different servers, or alternatively, the memory 124 may be duplicated in multiple servers. As shown in FIG. 3, the memory 124 may include a color matrix code verification routine 142. The color matrix code verification routine may be embodied as a non-transitory computer-readable storage medium that stores computer-readable program code executable by a processor, such as processing circuit 126A, to receive the message 132, including the color matrix code 112.

Generally, in a cryptographic scheme, cryptographic keys may be used to encrypt elements of messages in blocks, consistent with disclosed embodiments. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element. In some aspects, the corresponding cryptographic keys may be available to members of authentication system, such as the financial institution servers 140A.

In the example of FIG. 3, the color matrix code 112 may be transmitted as the first layer 114 and the second layer 116. In addition, the computer-readable program code of color matrix code verification routine 142 may additionally be executable to generate and transmit a response message 134. In the example of FIG. 3, the response message 134 may be sent to the provider 120 for processing. As further shown in FIG. 3, the color matrix verification routine 142 may include a layer decryption processor 144, as well as an account verification processor 146. As such, the layer decryption processor 144 may be triggered by receipt of the message 132 to decrypt on or more layers of the color matrix code 112. For example, the financial institution servers 140A may include a decryption key 148, operative to decrypt information of the first layer 114. The account verification processor 146 may be operative to generate an account authorization response 149 in the response message 134 to authorize a financial transaction associated with a financial account identified in the color matrix code 112.

In one embodiment, the first layer 114 may include general bank account information for a financial account of the user of transaction device 110, while the second layer includes a routing number for the financial account. In one implementation, the routing number may be encrypted in the first layer 114, while the layer decryption processor 144 uses the decryption key 148 to decrypt the information of first layer 114 to determine the routing number. The financial institution servers 140A may then retrieve certain information associated with the financial account and generate the account authorization response 149 for sending to the provider 120 when appropriate. In one embodiment, the account authorization response 149 may include sufficient information for the provider 120 to debit or transfer assets from the user financial account associated with color matrix code 112.

Figure 4:
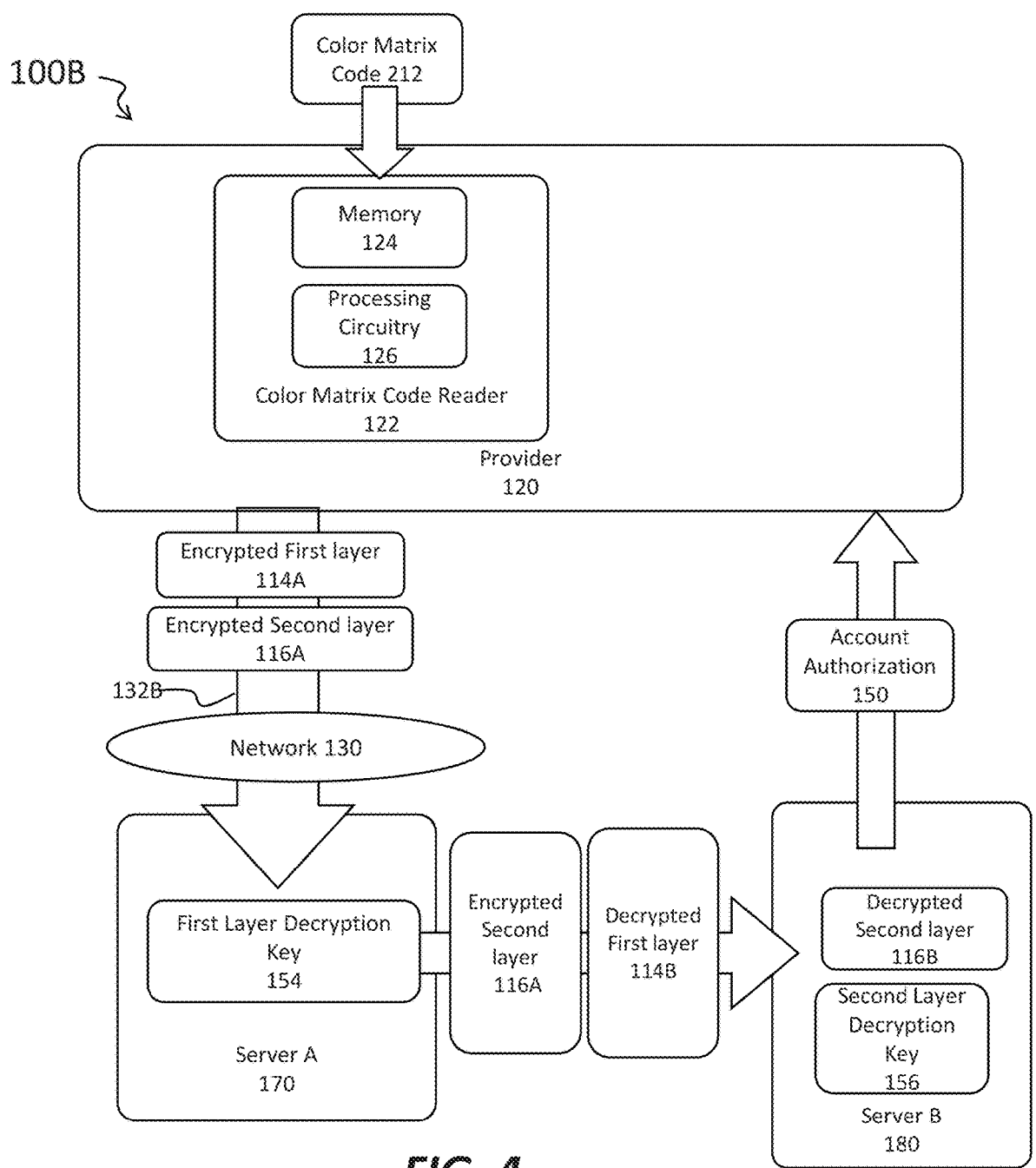
FIG. 4 shows a system according to additional embodiments of the disclosure.

In further embodiments of the disclosure, a color matrix code may include multiple encrypted layers, where different encrypted information is stored in different layers. FIG. 4 shows a system 100A, where a color matrix code 212 includes an encrypted first layer 114A and an encrypted second layer 116A. After being extracted from the color matrix code 212 at the provider 120, the encrypted first layer 114A and an encrypted second layer 116A may be transmitted in message 132B to a server A 170. As an example, a given layer of the color matrix code 212 may include a first address, where the processing circuitry 126 is arranged to transmit at least one layer of the color matrix code 212 to the first address (for the sever A 170), upon reading of the first layer and the second layer. In the example of FIG. 4, the encrypted first layer 114A and an encrypted second layer 116A may be transmitted initially to the server A 170. The server A 170, in turn, may include a first layer decryption key 154, to facilitate decryption of the encrypted first layer 114A.

To increase security, the encrypted second layer 116A may be sent to a different server, shown as server B 180, for decryption. The color matrix code 212 may include a second address (for the server B 180). In the example of FIG. 4, the server A 170 may forward a message including the decrypted first layer 114B and encrypted second layer 116A. In other embodiments, the encrypted second layer 116A may be sent directly to the server B 180 from the provider 120. Following the example of FIG. 4, the server B 180 may include a second layer decryption key 156, to facilitate decryption of the encrypted second layer 116A, generating the decrypted second layer 116B. After determining the account information provided in the decrypted second layer 116B, and the decrypted first layer 114B, the financial institution, as embodied in server B 180 may return an account authorization message 150 to the provider 120.

Thus, different layers of the color matrix code may be decrypted by different servers, wherein no message transmitted across a network includes all the layers of the color matrix code 212 in unencrypted form.

Figure 5:
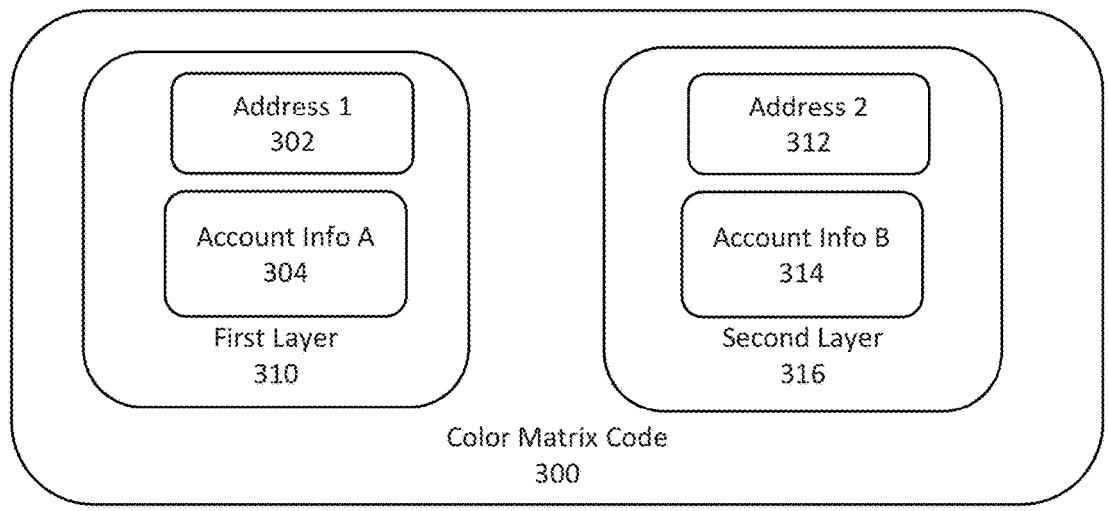
FIG. 5 depicts another exemplary color matrix code, according to some embodiments of the disclosure.

To facilitate flexibility of processing a color matrix code may be arranged wherein a first layer containing a first set of information include a first address, while a second layer containing a second set of information includes a second address, different from the first address. FIG. 5 presents a color matrix code 300, including a first layer 310 and second layer 316. As such, the first layer 310 may correspond to a first color channel, while the second layer 316 corresponds to a second color channel. The first layer 310 further includes and address 1 302 and account information A 304, while second layer 316 further includes and address 2 312 and account information B 314. As such, the color matrix code 300 may be processed to send different layers of the color matrix code 300 to different servers or computers, associated with the different addresses. As in the embodiments of FIG. 4, at least one of the layers of the color matrix code 0 may be stored in encrypted form.

While aforementioned embodiments have highlighted color matrix code processing using two layers, in other embodiments, a color matrix code may include three or more layers. In particular embodiments, a first layer, corresponding to a first color channel, may include a first account identifier associated with a financial account, while a second layer, corresponding to a second color channel, includes account data of the financial account. A third layer may include a second account identifier, associated with the account, where the third layer corresponds to a third color channel, different from the first color channel and the second color channel.

Figure 6:
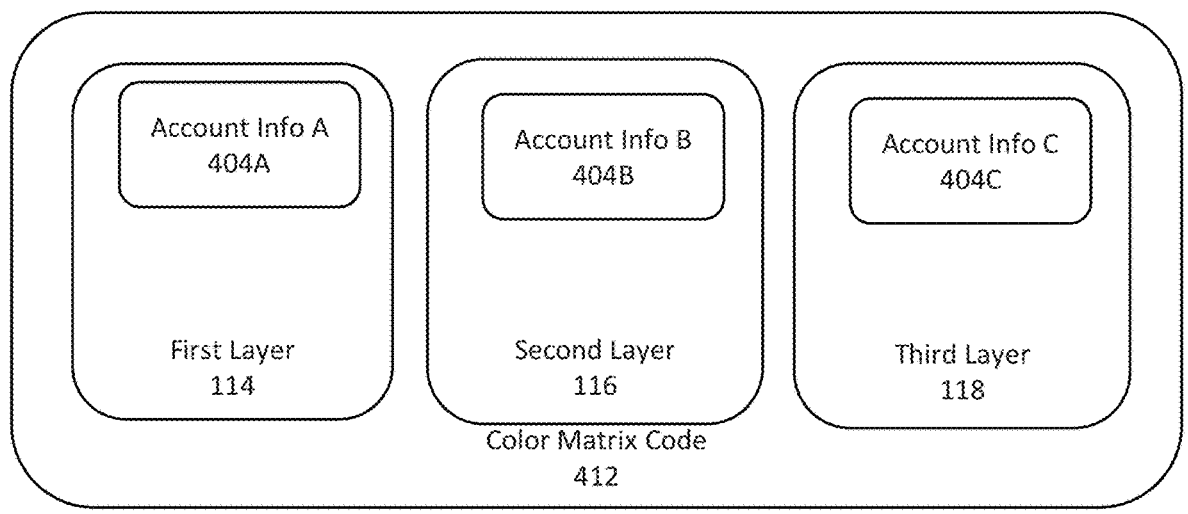
FIG. 6 depicts an exemplary color matrix code, according to some embodiments of the disclosure.

FIG. 6 depicts a color matrix code 412 including a first layer 114, second layer 116, and third layer 118. As such these layers may include account information A, account information B and account information C, respectively. These different layers may be read, decrypted, and/or processed in different computers (servers) of the same server as the case may be.

In one embodiment, first layer 114 may include an account number of a financial account, the third layer 118, a router number of the financial account, and the second layer 116 an account balance of the financial account. An advantage of embedding the different layers in a color matrix code is that more information may be contained in the color matrix code 412, composed of three different layers, than in a known black and white matrix code, having a similar size. The provision of separate layers to capture account information in three different layers also may reduce errors due to more reliable encoding of information in a color matrix code as compared to black and white matrix codes.

While the aforementioned embodiments have described color matrix codes including layers that correspond to a given color channel within visible light range, such as red-green or blue-yellow, in other embodiments, at least one layer of the color matrix code may correspond to a color channel lying at least partially outside of the visible light range. Exemplary layers of a color matrix code may include a layer corresponding to an infrared color channel, or to an ultraviolet color channel. As such, a color matrix code formed having a layer formed from a non-visible light color channel may include known materials readable by an infrared detector (camera) or an ultraviolet detector (camera). In some examples, a given camera or system for imaging a color matrix code including an infrared layer or ultraviolet layer may include detection apparatus capable of imaging both visible radiation and infrared radiation in a near infrared color range, or ultraviolet radiation in an ultraviolet color range, as the case may be.

Figure 7:
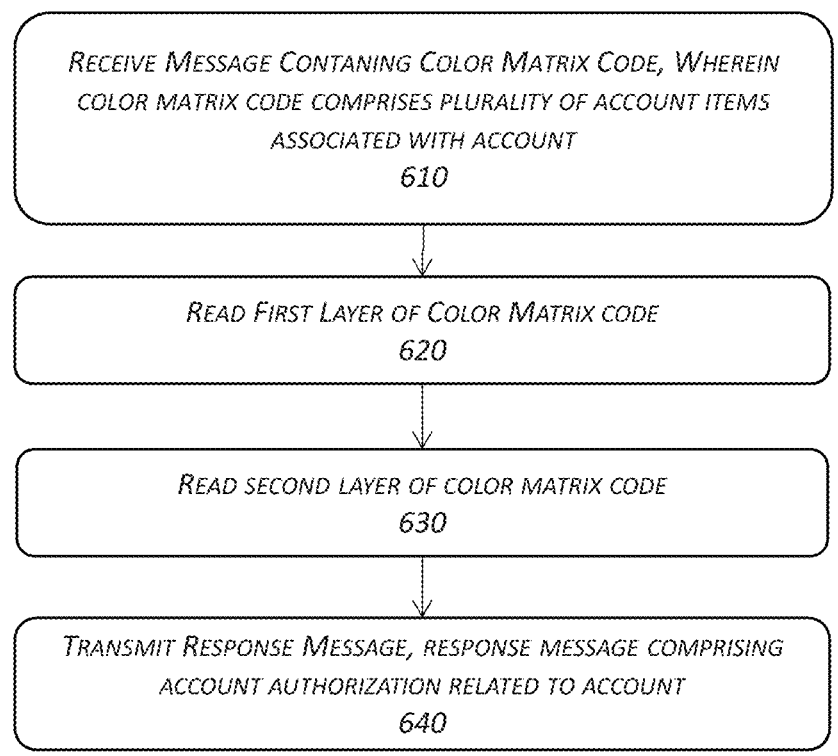
FIG. 7 illustrates an embodiment of a first logic flow.

FIG. 7 illustrates an embodiment of a logic flow 600. The logic flow 600 may be representative of some or all of the operations executed by one or more embodiments described herein. Embodiments are not limited in this context. At block 610, a message is received including a color matrix code. The color matrix code may include a plurality of account information or items, associated with an account, such as a financial account. At block 620, a first layer of the color matrix code is read. The first layer may correspond to a first color channel of the color matrix code. At block 630, a second layer of the color matrix code is read. The second layer may correspond to a second color channel of the color matrix code, different than the first color channel. In so doing, the reading of the first layer and the second layer may provide account identifier(s) for the financial account, as well as other information.

At block 640, a response message is transmitted, where the response message may include authorization for a transaction related to the financial account, as well as specific account information. The response message may be transmitted to the source of the message including the color matrix code.

Figure 8:
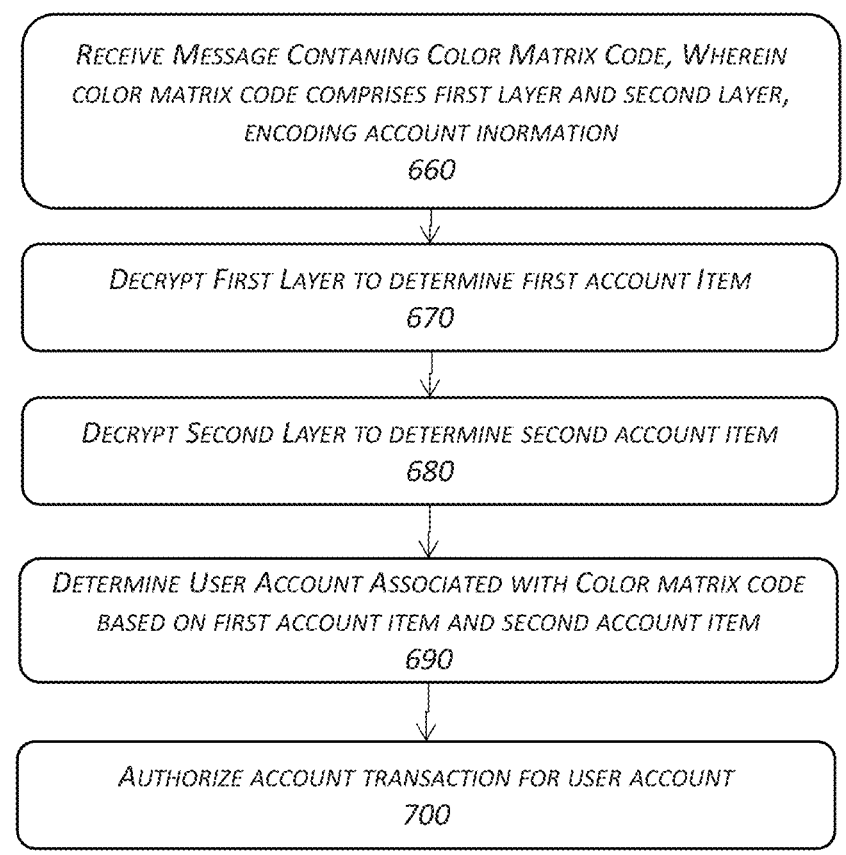
FIG. 8 illustrates an embodiment of a second logic flow.

FIG. 8 illustrates an embodiment of a logic flow 650. The logic flow 650 may be representative of some or all of the operations executed by one or more embodiments described herein. Embodiments are not limited in this context. At block 660, a message is received including a color matrix code, where the color matrix code includes a first layer and a second layer, encoding account information. The message may be received at a financial institution in some embodiments. The first layer may be formed using colors in a first color channel while the second layer is formed using colors in a second color channel, different from the first color channel. According to various embodiments, the first layer and the second layer may each encode information in encrypted form.

At block 670, the first layer is decrypted to determine a first account item. In some embodiments, the first account item may correspond to account information of a user financial account. The decryption may be performed according to any suitable encryption/decryption scheme. In some embodiments, a decryption key related to the user financial account may be stored in the financial institution. The decryption key may be used to decrypt the first layer. The first account item may identify a location of the user financial account, such as a router number.

Similarly to block 670, At block 680, the second layer is decrypted to determine a second account item.

At block 690, a user account is determined based upon the first account item and the second account item.

At block 700, an account authorization for the user account is provided.

Figure 9:
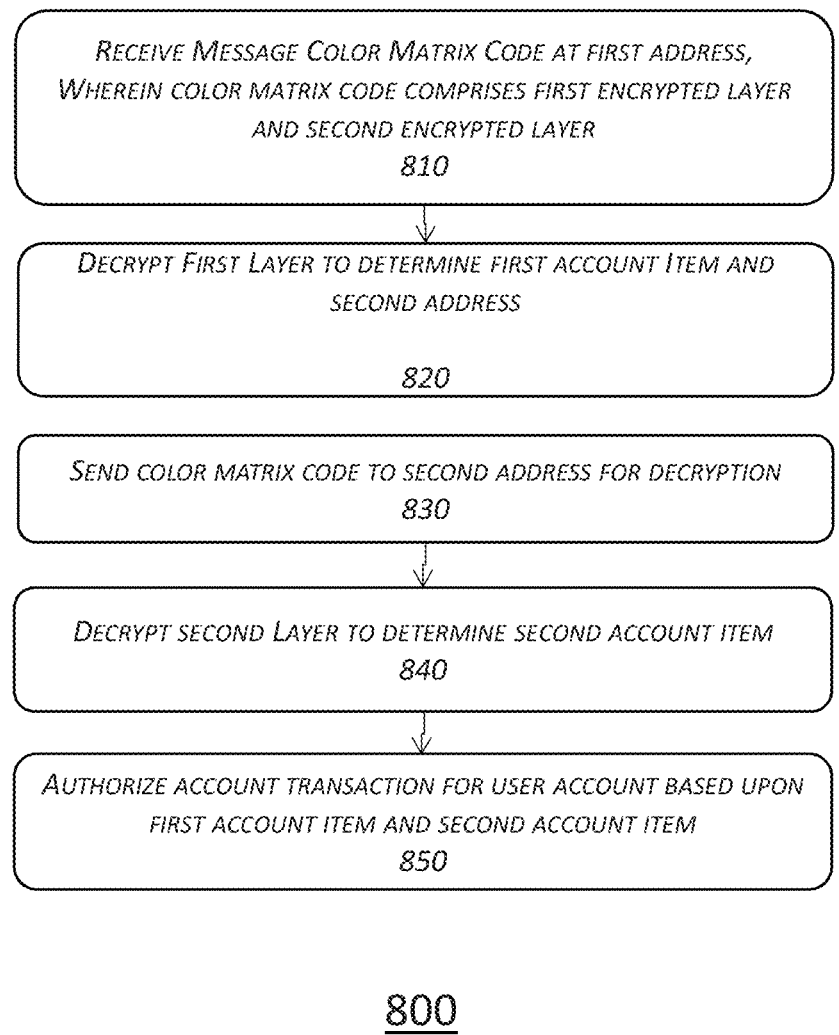
FIG. 9 illustrates an embodiment of a third logic flow.

FIG. 9 illustrates an embodiment of a logic flow 800. The logic flow 800 may be representative of some or all of the operations executed by one or more embodiments described herein. Embodiments are not limited in this context.

At block 810, a Color Matrix Code is received at a first address, where the color matrix code comprises a first encrypted layer and a second encrypted layer. At block 820, the First Layer is decrypted to determine first account Item and a second address. At block 830, the color matrix code is sent to second address for decryption. At block 840, the second Layer is decrypted to determine second account item. At block 850, an account transaction is authorized for user account based upon first account item and second account item.

Figure 10:
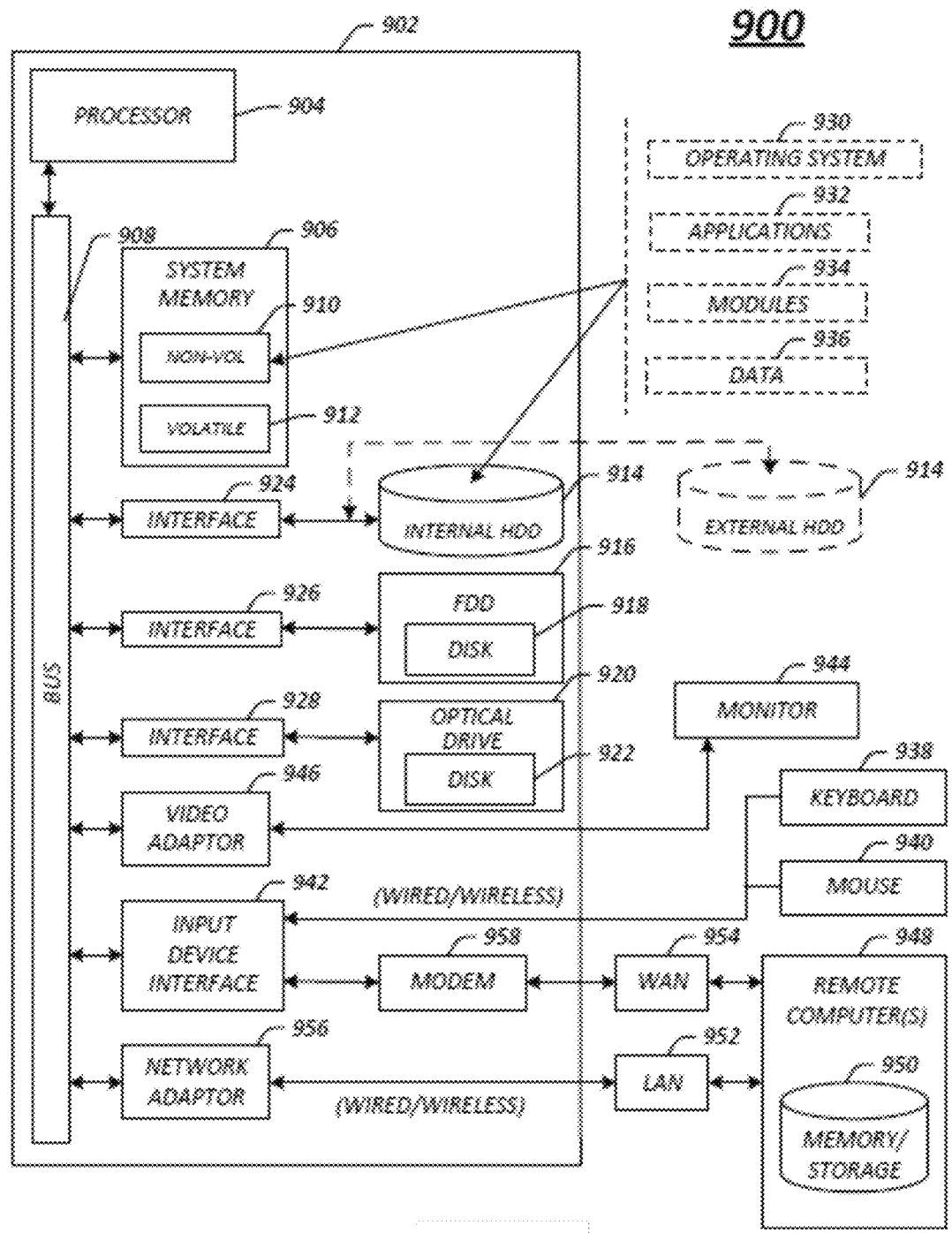
FIG. 10 illustrates an embodiment of a computing architecture.

FIG. 10 illustrates an embodiment of a computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100. In some embodiments, computing system 902 may be representative, for example, of a color matrix code reader of a provider 140, financial institution servers 140A, and so forth. More generally, the computing architecture 900 is configured to implement all logic, applications, systems, methods, apparatuses, and functionality described herein with reference to FIGS. 1-9.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units, non-volatile memory 910, volatile memory 912, including an operating system 930, one or more application programs 932, other program modules 934, and program data 936. In one embodiment, the one or more application programs 932, other program modules 934, and program data 936 can include, for example, the various applications and/or components of the system 100, including layer decryption processor 144, account verification processor 146, and so forth.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
   a memory to store instructions; and
   processing circuitry, coupled with the memory, operable to execute the instructions, that when executed, cause the processing circuitry to:
   identify a matrix code;
   read a first layer of the matrix code, the first layer comprising a first account identifier associated with an account, wherein the first layer corresponds to a first color channel; and
   read a second layer of the matrix code, the second layer comprising a set of account data, associated with the account, wherein the second layer corresponds to a second color channel, different than the first color channel, wherein at least one color channel of the first color channel and the second color channel lies at least partially outside of the visible light range.

2. The apparatus of claim 1, the processing circuitry to:
   read a third layer of the matrix code, the third layer comprising a second account identifier, associated with the account, wherein the third layer corresponds to a third color channel, different from the first color channel and the second color channel.

3. The apparatus of claim 2, the first layer comprising an account number of a financial account, the third layer comprising a router number of the financial account, and the second layer comprising an account balance of the financial account.

4. The apparatus of claim 2, wherein the third color channel comprises a luminance channel, wherein a lightness is expressed as a numerical value.

5. The apparatus of claim 1, the matrix code comprising an address, the processing circuitry to:
   transmit at least one layer of the matrix code to the address, upon reading of the first layer and the second layer.

6. The apparatus of claim 1, the matrix code comprising a set of encrypted information, embedded in at least one layer of the matrix code.

7. The apparatus of claim 1, the matrix code comprising a two-dimensional bar code.

8. A method, comprising:
   receiving a message, comprising a matrix code, the matrix code comprising:
   a first layer comprising a first account identifier associated with an account, wherein the first layer corresponds to a first color channel; and
   a second layer, the second layer comprising a set of account data, associated with the account, wherein the second layer corresponds to a second color channel, different than the first color channel; and
   transmitting a response to the message, the response comprising a transaction authorization, associated with the account, wherein at least one color channel of the first color channel and the second color channel lies at least partially outside of the visible light range.

9. The method of claim 8, wherein at least one layer of the matrix code comprises a set of encrypted information, the method further comprising:
   receiving a decryption key, associated with the matrix code; and
   decrypting the set of encrypted information using the decryption key, to generate a set of unencrypted information.

10. The method of claim 8, the matrix code further comprising:
    a third layer, the third layer comprising a second account identifier, associated with the account, wherein the third layer corresponds to a third color channel, different from the first color channel and the second color channel.

11. The method of claim 10, the first layer comprising an account number of a financial account, the third layer comprising a router number of the financial account, and the second layer comprising an account balance of the financial account, wherein at least one of the account number, the router number, and the account balance is received in encrypted form.

12. The method of claim 9,
    wherein the matrix code is received at a first address, wherein the set of encrypted information comprises a first set of encrypted information, arranged in the first layer, and a second set of encrypted information, arranged in the second layer, the method further comprising:
    after the decrypting the first set of encrypted information, transmitting the second set of encrypted information to a second address, the second address being embedded in the matrix code.

13. The method of claim 8, the matrix code comprising a two-dimensional bar code.

14. The method of claim 8, wherein at least one channel comprises a luminance channel, wherein a lightness is expressed as a numerical value.

15. A non-transitory computer-readable storage medium, storing computer-readable program code executable by a processor to:
receive a message, comprising a matrix code, the matrix code comprising:
a first layer comprising a first account identifier associated with an account, wherein the first layer corresponds to a first color channel, and
a second layer, the second layer comprising a set of account data, associated with the account, wherein the second layer corresponds to a second color channel, different than the first color channel; and
transmit a response, to the message, the response comprising transaction authorization, associated with the account, wherein at least one color channel of the first color channel and the second color channel lies at least partially outside of the visible light range.

16. The non-transitory computer-readable storage medium of claim 15, wherein at least one layer of the matrix code comprises a set of encrypted information, the computer readable program code to:
receive a decryption key, associated with the matrix code; and
decrypt the set of encrypted information using the decryption key, to generate a set of unencrypted information.

17. The non-transitory computer-readable storage medium of claim 15, the matrix code further comprising:
a third layer, the third layer comprising a second account identifier, associated with the account, wherein the third layer corresponds to a third color channel, different from the first color channel and the second color channel.

18. The non-transitory computer-readable storage medium of claim 17, the first layer comprising an account number of a financial account, the third layer comprising a router number of the financial account, and the second layer comprising an account balance of the financial account, wherein at least one of the account number, the router number, and the account balance is received in encrypted form.

19. The non-transitory computer-readable storage medium of claim 16,
wherein the matrix code is received from at first address, wherein the set of encrypted information comprises a first set of encrypted information,
wherein the matrix code is received at a first address, wherein the set of encrypted information comprises a first set of encrypted information, arranged in the first layer, and a second set of encrypted information, arranged in the second layer,
the computer readable code to transmit the second set of encrypted information to a second address.

20. The non-transitory computer-readable storage medium of claim 15, the matrix code comprising a two-dimensional bar code, and wherein the first color channel or the second color channel comprises a near infrared color range or an ultraviolet color range.

* * * * *